United States Patent [19]

Kanamaru

[11] 4,425,583

[45] Jan. 10, 1984

[54] VIDEO DISC PLAYER HAVING TIME BASE VARIATIONS ELIMINATED IN BOTH AUDIO AND VIDEO SIGNALS

[75] Inventor: Hitoshi Kanamaru, Saitama, Japan

[73] Assignee: Universal Pioneer Corporation, Tokyo, Japan

[21] Appl. No.: 260,614

[22] Filed: May 5, 1981

[30] Foreign Application Priority Data

May 6, 1980 [JP] Japan ................................ 55-60610[U]

[51] Int. Cl.³ ............................................. H04N 9/491
[52] U.S. Cl. .................................. 358/322; 358/325; 358/326
[58] Field of Search ............... 358/320, 322, 324, 325, 358/326, 342, 337, 338; 369/111, 44, 45, 46

[56] References Cited

U.S. PATENT DOCUMENTS

| | | | |
|---|---|---|---|
| 3,381,086 | 4/1968 | De Moss et al. | 369/111 X |
| 3,530,258 | 9/1970 | Gregg et al. | 369/111 X |
| 3,580,991 | 5/1971 | Krause | 358/325 |
| 3,711,641 | 1/1973 | Palmer | 358/322 |
| 3,934,262 | 1/1976 | Snopko | 358/322 |
| 3,967,311 | 6/1976 | Fuhrer | 358/322 |
| 3,996,606 | 12/1976 | Pritchard | 358/326 X |
| 4,198,657 | 4/1980 | Kanamaru | 369/111 X |
| 4,313,129 | 1/1982 | Fukui | 358/322 X |

*Primary Examiner*—Stuart N. Hecker
*Assistant Examiner*—Donald McElheny, Jr.
*Attorney, Agent, or Firm*—Sughrue, Mion, Zinn, Macpeak & Seas

[57] ABSTRACT

A video disc player in which undesirable frequency variations in reproduced video and audio signals due to absence of the color burst signal during the vertical retrace time are eliminated. A first control unit actuates a tangential mirror driver unit in response to a phase difference produced by comparing a horizontal synchronizing signal from the reproduced video signal with a reference color subcarrier signal. The video signal is delayed by an electronically-controlled variable delay line the delay time of which is set on accordance with a phase difference between the color burst signal and a reference horizontal synchronizing signal.

6 Claims, 8 Drawing Figures

VIDEO DISC PLAYER HAVING TIME BASE VARIATIONS ELIMINATED IN BOTH AUDIO AND VIDEO SIGNALS

BACKGROUND OF THE INVENTION

The present invention relates to an improved video disc player. Specifically, the invention relates to a video disc player in which reproduced picture quality and reproduced sound quality are improved.

A prior art video disc player is constructed as shown in FIG. 1. A laser beam emanating from a laser tube 1 is focused onto the signal recorded surface of a disc 7 through a diverging lens 2, a beam splitter 3, a tangential mirror 5, a tracking mirror (not shown), and an objective lens 6. Reference numeral 8 designates a motor for turning the disc 7. Pits are formed on the surface of the disc along a spiral track. The length of the pits and the spacing between pits are representative of the recorded signal which is frequency modulated by the television video signal and the audio signal. The laser beam thus focused onto the surface of the disc is modulated by these pits. The beam reflected therefrom passes again through the objective lens 6 and the tangential mirror 5 and is applied to the beam splitter 3 for directing the reflected light toward a light receiving element 4. Changes in the amount of reflected light are converted into an electric signal by the light receiving element 4.

In this manner, the video signal and the audio signal recorded on the disc 7 are read. The video signal and the audio signal are multiplexed in the form of a frequency-modulated signals.

The output of the light receiving element 4 is amplified by an amplifier 9 and then applied to both a sound demodulator circuit 10 and a video demodulator circuit 12 to provide demodulated audio and video signals which are respectively fed through audio and video output terminals 11 and 13 to a TV monitor for reproduction.

For good video reproduction for color television, it is imperative to maintain the synchronizing signal frequency of the reproduced video signal at an accurate value and to suppress time base variations i.e., jitter, to a very small value, for example, no greater than 5 ns. For this purpose, it is necessary that the rotational speed of the disc 7 be precisely controlled. The speed of the motor 8 is controlled by a motor servo circuit while the deflection angle of the tangential mirror 5 is controlled by a tangential mirror servo circuit through a coil for driving the tangential mirror 5, which is an electromagnetically-controlled electromagnetic actuator.

First, the motor servo circuit will be described. A horizontal synchronizing signal obtained from a reproduced video signal and separated by a synchronizing signal separator circuit 14 is fed to a phase comparator 16 and is compared with a reference horizontal synchronizing signal which is produced in a reference synchronizing signal generator 15. The output of the phase comparator 16 is applied to a motor control circuit 17 for controlling the motor speed so that the two synchronizing signals are in phase. However, the circuit cannot adequately follow fast variations in the horizontal synchronizing signal due to the large moment of inertia of the disc 7, so that residual jitter at a higher frequency appears in the output. In order to eliminate such jitter, the tangential mirror 5, having a small amount of inertia, is moved in the direction of disc rotation in a direction to compensate for this jitter. (For clarity, the swinging direction of the tangential mirror is changed as shown in FIG. 1.)

Next, the tangential mirror servo circuit will be described. The reproduced video signal is fed to a burst gate circuit 18 where a burst signal containing reference color information is reproduced and then applied to a gate circuit 19. The gate circuit 19, which also receives a horizontal synchronizing signal reproduced and separated by the synchronizing signal separator circuit 14, operates to detect a specific rising or a falling edge of the reproduced burst signal which is generated at a predetermined time after the reproduced horizontal synchronizing signal. In other words, the gate circuit 19 produces a signal having a predetermined edge transition for every horizontal synchronizing signal reproduced, the timing edge being defined by the rising or falling pulse edge of the reproduced burst signal. In this case, the timing edge is preferably determined by the burst phase due to the phase accuracy of the burst signal, which 455/2 times higher than that of the horizontal synchronizing signal, because of the necessity for achieving a very high phase accuracy for proper reproduction of color signals.

The pulse signal thus obtained is fed to one terminal of the phase comparator 20 and is compared with the reference horizontal synchronizing signal which is applied to the other terminal thereof. Any phase difference thus detected is used to control the deflection angle of the tangential mirror 5 via the mirror control circuit 21. This results in the reproduction of stable color television at the video output terminal 13 without time base variations in synchronization with the reference sychronizing signal.

As indicated in FIG. 2A, however, no burst signal is present for a period of about 9H during the vertical blanking interval of the video signal, H representing one horizontal line scanning time which is 63.5 μs for standard TV signals. Due to the absence of the burst signal, the gate circuit 19 may not operate properly during this interval with edge to the phase comparator 20.

Consequently, the phase comparator 20 may produce a faulty phase difference signal during the vertical retrace time, as indicated in FIG. 2B, and hence the tangential mirror 5 may tend to be deflected in the incorrect direction. When a burst signal A appears again following the vertical retrace time, the gate circuit 19 will again operate properly and the phase comparator 20 will then produce a proper phase difference signal which causes the tangential mirror 5 to return to the correct angular position. Thus, the mirror 5 is again deflected without any phase error after some transient time as indicated in FIG. 2B. This process is repeated every vertical retrace time.

It thus may be seen that errors in the deflection angle of the tangential mirror 5 can occur at the repetition rate of the vertical retrace time (60 Hz under the Specification of National Television Standard Committee). The errors in the mirror's angular position may cause undesired frequency variations in reproduced FM signals every vertical blanking interval. As a result, pulse noise may be produced in the output of the sound demodulator circuit 10 as indicated in FIG. 2C. This results in a lowering of the reproduced sound quality due to pulsive noise induced the output at the vertical retrace repetition rate as indicated in FIG. 3.

In summary, conventional video disc players as shown in FIG. 1 can reproduce color pictures of good stability, but have the disadvantage of poor sound reproduction due to inherent repeated pulsive noise.

An object of this invention is thus to provide a video disc player in which the above-noted drawback is eliminated and audio signals of high quality and video signals of high stability are produced without time base variations.

SUMMARY OF THE INVENTION

In accordance with this and other objects of the invention, there is provided a video disc player for reproducing video and audio signals recorded on a disc including first phase comparing means for producing a first control signal representing a phase difference between a horizontal synchronizing signal from a reproduced video signal and a first reference synchronizing signal, first control means for controlling an electromagnetic actuator in response to the first control signal, an electronically-controlled variable delay line for delaying the reproduced video signal, second phase comparing means for producing a second control signal representing a phase difference between a color burst signal from the video signal and a second reference synchronizing signal, and second control means for establishing the delay time of the electronically-controlled variable delay line in response to the second control signal. The electromagnetic actuator may be a tangential mirror driver unit used for deflecting a reading laser beam onto a video disc being played. The second and first reference synchronizing signals are, respectively, a reference color subcarrier signal and a reference horizontal synchronizing signal in a preferred embodiment. The electronically-controlled variable delay line may be a charge transfer device such as a charge-coupled device or a bucket brigade device or, otherwise, may be a coil and a varactor diode.

DESCRIPTION OF THE PREFERRED EMBODIMENTS

Figure 4:
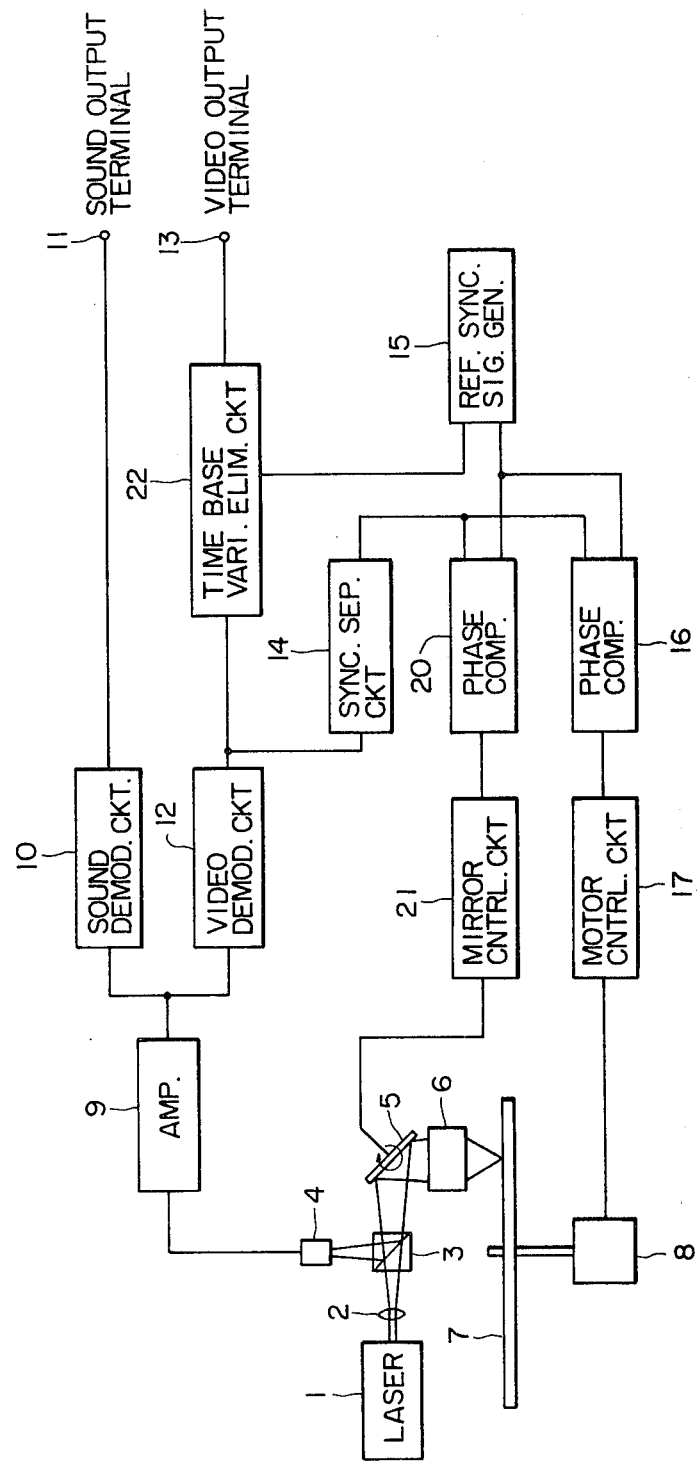
FIG. 4 is a block diagram of a preferred embodiment of a video disc player of the invention.

Referring now to FIG. 4 a preferred embodiment of a video disc player, in which like symbols represent like components or parts which are employed in the prior art video disc player shown in FIG. 1, will be described.

In this video player, the focusing of the laser beam and the arrangement of the motor servo circuit are similar to the prior art device. That is, a horizontal synchronizing signal reproduced and separated by a synchronizing signal separator circuit 14 is compared with a reference horizontal synchronizing signal produced by the synchronizing signal generator 15 and the speed of a motor 8 is controlled in accordance with the phase difference. A tangential mirror servo circuit is so arranged as to deflect the tangential mirror 5 using a mirror control circuit 21 operating in response to the output of a phase comparator 20 which compares the horizontal synchronizing signal reproduced and separated by the synchronizing signal separator circuit 14 with the reference horizontal synchronizing signal from the synchronizing signal generator 15 in the same manner as in the motor servo circuit.

Figure 5:
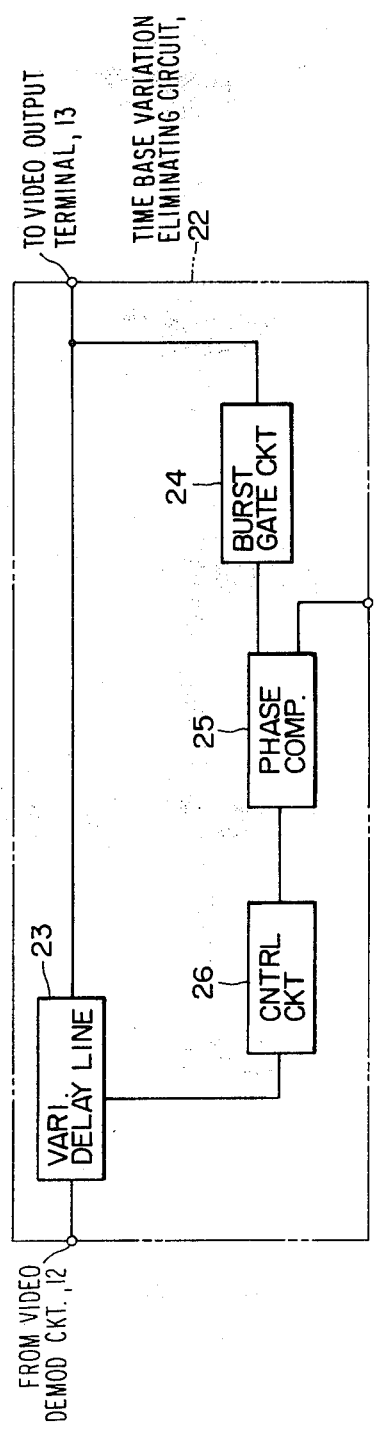
FIGS. 5 and 6 are block diagrams showing two examples of a time base variation eliminating circuit which is applied in the video disc player of FIG. 4.

In accordance with the invention, a time base variation eliminating circuit 22 is interposed between the output terminal of a video signal demodulator circuit 12 and a video output terminal 13. The time base variation eliminating circuit 22 is constructed for example as shown in FIG. 5. Reference numeral 24 represents a burst gate circuit for extracting a burst signal from the reproduced video signal and 25 represents a phase comparator which compares the output from the burst gate circuit 24 with a reference color subcarrier signal produced by the synchronizing signal generator 15. Reference numeral 23 represents an electronically-controlled variable delay line the delay time of which is controlled in accordance with an input control signal. Reference numeral 26 represents a control circuit which produces a control signal for the delay line 23 in response to the output signal of the phase comparator 25. If, for example, the delay line 23 is implemented with a charge-coupled device or bucket brigade device, the control circuit 26 produces a transfer clock signal having a frequency determined by the output of the phase comparator 25. In this case, the control circuit 26 can be implemented with a voltage-controlled oscillator.

The operation of the above-described arrangement will now be described.

With the video disc player of the invention, the tangential mirror servo circuit requires no burst signal for control so that the phase comparator 20 can produce a phasse error signal properly even during the vertical blanking interval because the horizontal synchronizing signal is present during the vertical blanking interval. Thus, the tangential mirror 5 is prevented from any possible faulty deflection as may arise in prior art devices. This eliminates the possibility of undesireable frequency variations which could otherwise appear in reproduced FM signals and there is no noise, such as may be induced by improper deflection of the tangential mirror 5, in sound signals reproduced by the sound demodulator circuit 10.

Video signals reproduced and made free from time base variations using the tangential mirror servo circuit without the use of the burst signal for control may be satisfactory for black-and-white. For color television, however, good color pictures cannot be produced without uneven color reproduction caused by slight instability or jitter in the timing of reproduced horizontal synchronizing signals due to noise and other factors. Such residual jitter is negligible, however, for reproduction of sound signals.

On the other hand, the burst signal from the burst gate circuit 24 is compared with the reference color subcarrier signal from the synchronizing signal generator 15 by the phase comparator 25 and the delay time can be controlled so that the reproduced video signal is synchronized with the reference subcarrier signal. Thus, time base variations due to such residual jitter are eliminated. Time base variations inherently cannot be large with the tangential mirror servo circuit using no burst signal for control factor. Generally, any residual time base variation are no more than 1 $\mu$s. Residual variations of 1 $\mu$s or less are eliminated with the time base variation eliminating circuit 22.

Elimination of residual time base variations of 1 μor less can be accomplished with the time base variation eliminating circuit 22 using charge-coupled devices as the delay line 23. Only one-fortieth the bit length of the charge-coupled device is needed than would otherwise be required if the tangential mirror 5 were fixed. This makes the device of the invention quite economical.

Furthermore, an analog delay line composed of a coil and a varactor diode may also be employed as the electronically-controlled variable delay line 23. In this case, the control circuit 26 is constructed to apply to the varactor diode a voltage which varies in response to the output of the phase comparator 25 wherein the delay time is controlled with the output from the control circuit 26.

Figure 6:
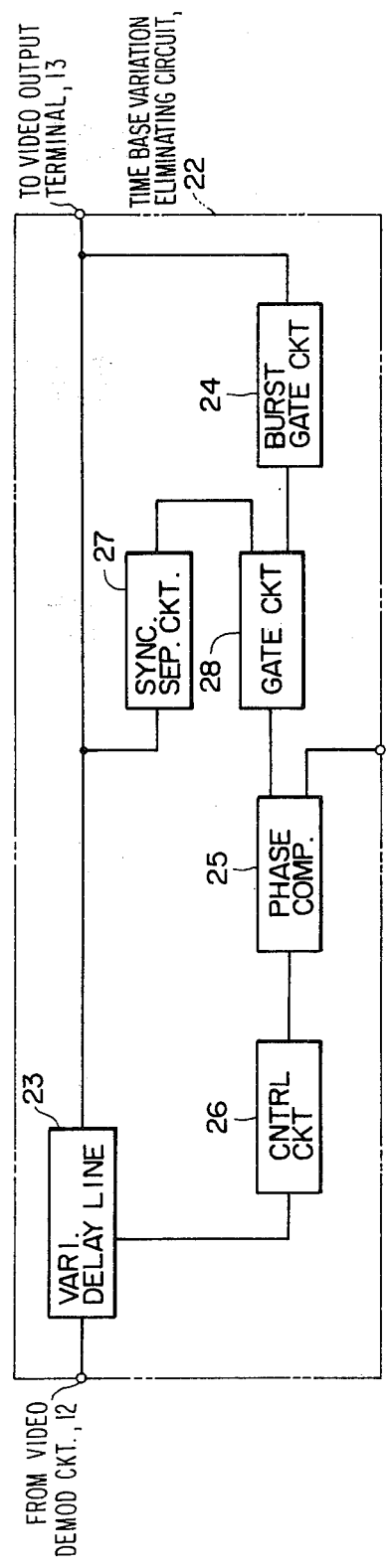

FIG. 6 is a block diagram showing another preferred embodiment of the time base variation eliminating circuit 22. In FIG. 6, reference numeral 27 represents a horizontal synchronizing signal separator circuit and 28 a gate circuit. With the time base variation eliminating circuit of FIG. 6, a horizontal synchronizing signal obtained from a reproduced video signal and separated therefrom by the horizontal synchronizing signal separator circuit 27 is fed to the gate circuit 28 and a color burst signal extracted from the reproduced video signal by a burst circuit 24 is applied to the gate circuit 28 so that the timing edge of the horizontal synchronizing signal thus reproduced is determined by a specific rising or falling pulse edge of the reproduced burst signal. The output of the gate circuit 28 is fed to a phase comparator 25 along with the reference horizontal synchronizing signal from the synchronizing signal generator 15.

Figure 1:
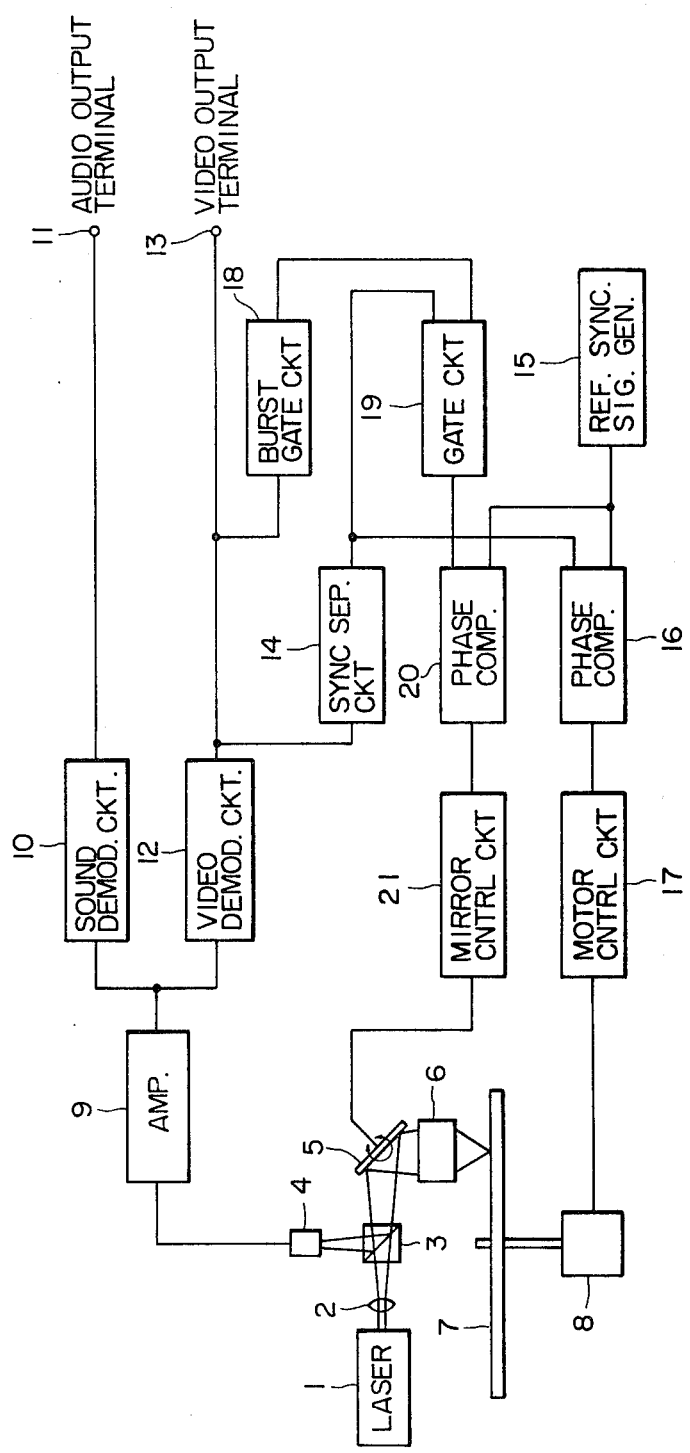
FIG. 1 is a block diagram showing a conventional video disc player.
Figure 2A:
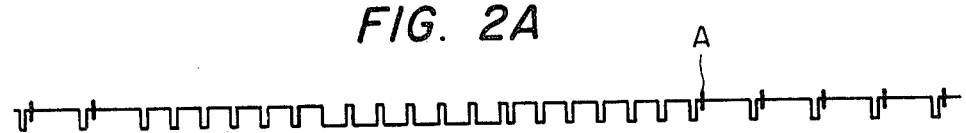
FIGS. 2A–2C and 3 show waveforms for description of the operation of the video disc player shown in FIG. 1.
Figure 2B:
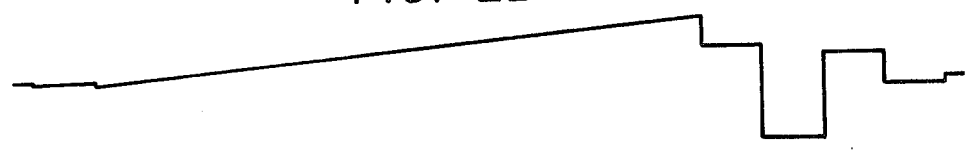
Figure 2C:
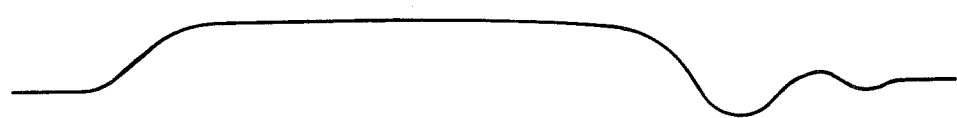
Figure 3:

The time base variation eliminating circuit of FIG. 6 is similar to the arrangement of the horizontal synchronizing signal separator circuit 14, burst gate circuit 18, gate circuit 19, and phase comparator 20 shown in FIG. 1 and operates in a similar manner to control the delay time whereby the same effect is obtained as with the time base variation eliminating circuit of FIG. 5.

Furthermore, in the embodiment shown in FIG. 4 only a single one of the phase comparators 16 and 20 in the motor servo circuit and in the tangential mirror servo circuit need be provided if desired. In this case, the output of the single phase comparator is applied to both the motor control circuit 17 and to the mirror control circuit 21.

Still further, the above-described device is applicable not only to optical-type video disc players but also contact-type players. This will be readily apparent from the fact that an arm stretcher employed in the latter type player is equivalent to the electromagnetic actuator for eliminating time base variations in the former.

As has been described heretofore, the invention permits reproduction of picture and sound of high quality. Particularly in picture reproduction, unevenness in color is effectively reduced compared with that of prior art video disc player devices, especially immediately following the vertical blanking interval, due to elimination of time base variations at two stages of control, namely, in the motor controller and the tangential mirror servo circuit and in the time base variation eliminating circuit. Moreover, time base variations in reproduced sound signals, which appeared at every vertical blanking interval in the prior art video disc players, are improved in comparison with the prior art devices.

Also, the time base variation eliminating circuit for sound signals of the invention is simple and inexpensive.

What is claimed is:

1. A video disc player for reproducing video and audio signals recorded on a disc comprising: means for rotating a disc to be played; a mirror for directing a beam of light onto a recorded track on said disc to be played; an electromagnetic actuator for controlling a tilting angle of said mirror to tangentially adjust said beam relative to said recorded track; means for producing a reproduced electrical video signal in response to light reflected from said recording track; means for separating a horizontal synchronizing signal contained in said reproduced video signal from said reproduced video signal; means for separating a color burst signal contained in said reproduced video signal from said reproduced video signal; means for producing first and second reference synchronizing signals, said first reference synchronizing signal having a frequency corresponding to a predetermined horizontal synchronizing frequency and said second reference synchronizing signal having a frequency corresponding to a predetermined color burst frequency; first phase comparing means for producing a first control signal representing a phase difference between the horizontal synchronizing signal separated from said reproduced video signal and said first reference synchronizing signal; first control means for controlling said electromagnetic actuator in response to said first control signal; an electronically-controlled variable delay line for delaying said reproduced video signal; second phase comparing means for producing a second control signal representing a phase difference between the color burst signal separated from said video signal and said second reference synchronizing signal; and second control means for establishing the delay time of said electronically-controlled variable delay line in response to said second control signal for thereby establishing a delay time of said reproduced video signal between said reproducing video signal producing means and a video output terminal.

2. The video disc player as claimed in claim 1 wherein said second and first reference synchronizing signals are a reference color subcarrier signal and a reference horizontal synchronizing signal, respectively.

3. The video disc player as claimed in claim 1 wherein said electronically-controlled variable delay line comprises a charge transfer device.

4. The video disc player as claimed in claim 3 wherein said charge transfer device comprises a charge-coupled device.

5. The video disc player as claimed in claim 3 wherein said charge transfer device comprises a bucket brigade device.

6. The video disc player as claimed in claim 1 wherein said electronically-controlled delay line comprises a coil and a varactor diode.

* * * * *